(No Model.)
H. PISTORIUS.
CABINET EASEL.
No. 487,964. Patented Dec. 13, 1892.
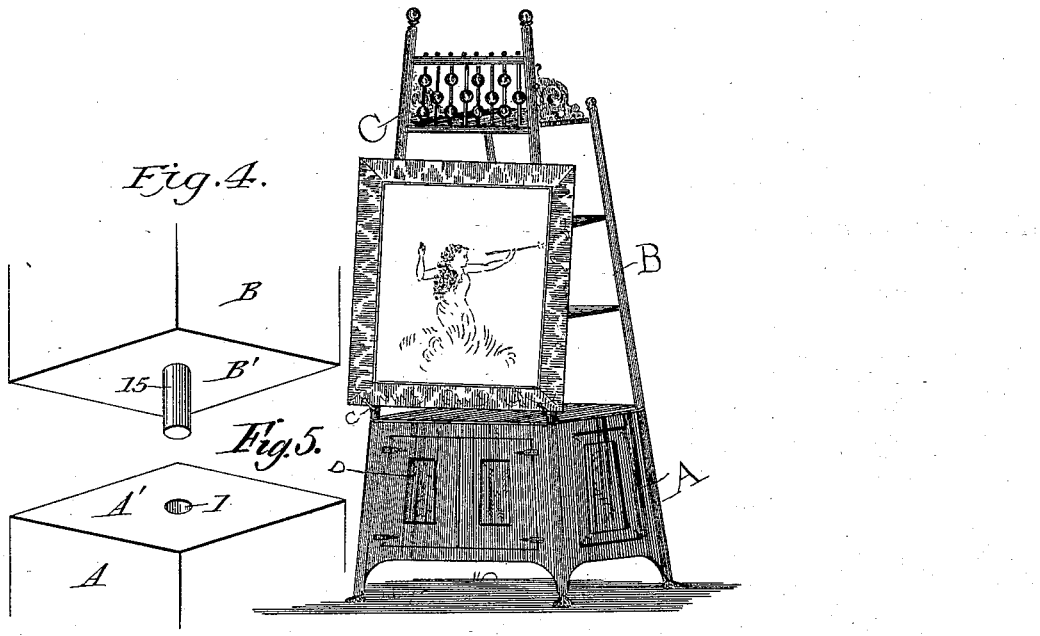
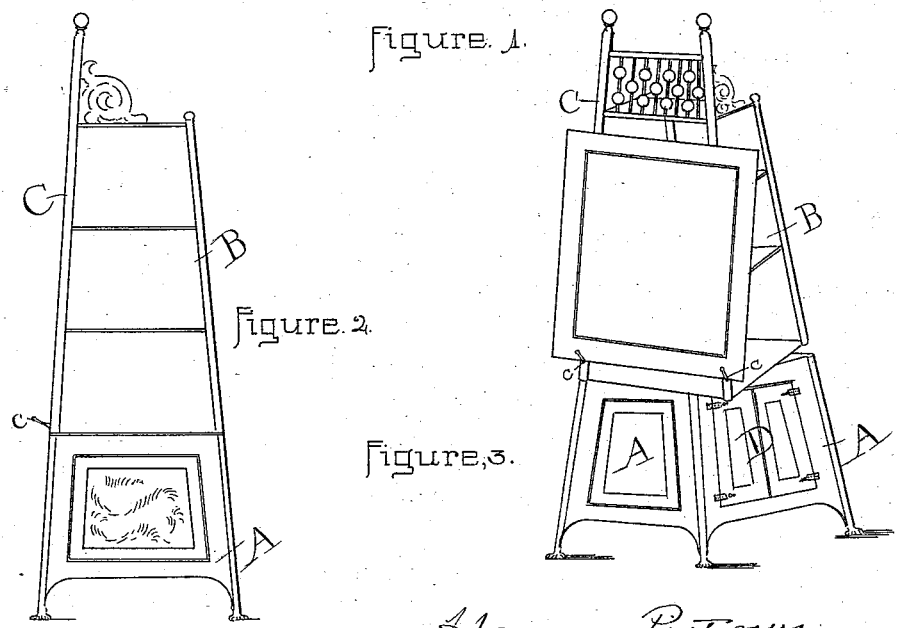
WITNESSES:
George A. McLandress
Wm M Smith
Herman Pistorius INVENTOR
By A. H. _____ ATTORNEY
THE NORRIS PETERS CO., PHOTO-LITHO., WASHINGTON, D. C.

UNITED STATES PATENT OFFICE.

HERMAN PISTORIUS, OF SAGINAW, MICHIGAN.

CABINET-EASEL.

SPECIFICATION forming part of Letters Patent No. 487,964, dated December 13, 1892.

Application filed February 29, 1892. Serial No. 423,120. (No model.)

*To all whom it may concern:*

Be it known that I, HERMAN PISTORIUS, a citizen of the United States, residing at Saginaw, in the county of Saginaw and State of Michigan, have invented a certain new and useful Cabinet-Easel; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a neat and convenient music rack and easel combined. This I have accomplished in the following-described article.

Figure 1 is a perspective view. Fig. 2 is a side elevation, and Fig. 3 is a perspective, showing the rack and easel partly revolved on the base. Figs. 4 and 5 show details of the device.

A is the base and is a four-sided cabinet, the sides slightly tapering inward toward the top. One side is provided with doors D. Above and resting upon the cabinet A is the rack B, the bottom of the rack B being of the size of the top of A and its sides slanting inward on same angle as sides of cabinet. The rack B, however, is not inclosed, as is A, but is open and provided with shelving for the reception of sheet-music, books, &c. The rack B revolves upon the base or cabinet A. Plate A', secured upon the top of the base, contains an orifice 1 for receiving a pin 15, projecting from plate B', secured upon the under side of the rack B, as shown in Figs. 4 and 5. When the rack is placed upon the base, the pin 15 sets loosely in the orifice 1, thus permitting the rack to turn upon the base. Any other well-known means for revolving the rack may be employed without departing from my invention.

Upon one side of the rack B, I form a picture rest or easel by inserting the pins $c\ c$ into the side posts of the rack B at or near the lower ends. The slant of the sides of the rack B will form sufficient recline for the picture.

The base A may be provided with casters, so as to be easily moved, the whole forming a very handsome parlor ornament, as well as a convenient and useful article.

Having thus described my invention, what I claim as new, and desire to secure by Letters Patent, is—

1. As a new article of manufacture, a revolving cabinet-easel consisting of a base in the form of a cabinet A and having upon the top thereof the plate A', containing an orifice 1, the rack B, consisting of a series of shelves supported by corner-posts C and having upon the bottom of the lower shelf the plate B', provided with a pin 15, adapted to fit and turn in the orifice 1 of plate A', and the pins $c\ c$ in the side posts C of the rack, adapted to hold a picture, substantially as described.

2. As a new article of manufacture, a revolving cabinet-easel consisting of a base in the form of a cabinet, a rack consisting of a series of shelves supported by corner-posts and revolubly supported upon the base, and an easel formed upon the side of the rack by pins $c\ c$ in the corner-posts, adapted to support a picture, and means for revolving the rack upon the base, substantially as described.

In testimony whereof I affix my signature in presence of two witnesses.

HERMAN PISTORIUS.

Witnesses:
A. H. SWARTHOUT,
GEORGE A. MCLANDRESS.